(12) United States Patent
Reybrouck et al.

(10) Patent No.: US 6,321,888 B1
(45) Date of Patent: Nov. 27, 2001

(54) DAMPER WITH EXTERNALLY MOUNTED SEMI-ACTIVE SYSTEM

(75) Inventors: Koenraad G. Reybrouck, Brussels; Rudi J. Schurmans, Kozen, both of (BE)

(73) Assignee: Tenneco Automotive Inc., Lake Forest, IL (US)

( * ) Notice: Subject to any disclaimer, the term of this patent is extended or adjusted under 35 U.S.C. 154(b) by 0 days.

(21) Appl. No.: 09/318,301

(22) Filed: May 25, 1999

(51) Int. Cl.$^7$ .................................................... F16F 9/54
(52) U.S. Cl. .............................. 188/322.2; 188/299.1; 188/313; 280/5.5; 280/5.515; 701/37; 701/48
(58) Field of Search ........................... 188/322.15, 200, 188/281, 282, 283, 284, 285, 313, 314, 299.1, 297, 322.2; 28/5.515; 701/37, 48; 280/5.5, 5.515

(56) References Cited

U.S. PATENT DOCUMENTS

| | | | |
|---|---|---|---|
| 3,757,910 | 9/1973 | Palmer | 188/322.14 |
| 3,823,600 | * 7/1974 | Wolff | 73/12 |
| 4,113,072 | 9/1978 | Palmer | 188/282.6 |
| 4,743,000 | 5/1988 | Karnopp | 267/218 |
| 4,743,046 | 5/1988 | Schnittger | 280/5.519 |
| 4,802,561 | 2/1989 | Knecht et al. | 188/318 |
| 4,890,858 | 1/1990 | Blankenship | 188/266.4 |
| 4,923,038 | 5/1990 | Lizell | 188/266.2 |
| 4,986,393 | 1/1991 | Preukschat et al. | 188/266.6 |
| 5,025,899 | 6/1991 | Lizell | 188/319.1 |
| 5,078,240 | 1/1992 | Ackermann et al. | 188/285 |
| 5,143,186 | 9/1992 | Lizell | 188/266.5 |
| 5,163,706 | * 11/1992 | Maguran | 280/707 |
| 5,201,389 | * 4/1993 | Miller | 188/299 |
| 5,217,095 | 6/1993 | Lizell | 188/266.5 |
| 5,231,583 | 7/1993 | Lizell | 701/37 |
| 5,295,563 | * 3/1994 | Bennett | 188/299 |
| 5,509,512 | * 4/1996 | Grundei | 188/284 |
| 5,775,470 | * 7/1998 | Feigel | 188/299 |
| 5,833,036 | * 11/1998 | Gillespie | 188/285 |
| 5,944,153 | * 8/1999 | Ichimaru | 188/299.1 |

* cited by examiner

Primary Examiner—J. J. Swann
Assistant Examiner—David Divine
(74) Attorney, Agent, or Firm—Harness, Dickey & Pierce, PLC (57) ABSTRACT

An automatic damper for an automobile automatic damper system which provides a compression valve operable to vary compressive damping characteristics of a damper, as well as a rebound valve operable to vary rebound damping characteristics of the damper. Use of the invention in cooperation with presently available electronic control modules and sensing algorithms provides a damper with either discrete valves or continuously variable valves for independently setting the rebound and compression damping characteristics of the damper.

18 Claims, 4 Drawing Sheets

FIG. 2.

DAMPER WITH EXTERNALLY MOUNTED SEMI-ACTIVE SYSTEM

BACKGROUND OF THE INVENTION

1. Field of the Invention

This invention relates generally to hydraulic dampers, and more particularly to a new and improved semi-active damper with an externally mounted valve assembly for selectively varying stiffness of the damper in compression and separately selectively varying stiffness of the damper in rebound.

2. Description of Related Art

Dampers are used in conjunction with automotive suspension systems to absorb unwanted vibrations which occur while driving a vehicle. In order to absorb unwanted vibrations, dampers are generally connected between the body and the suspension of an automobile. A piston is located within the damper which is connected to the body of the automobile through a piston rod. Furthermore, the damper body is connected to the suspension of the automobile. Because the piston is able to limit the flow of damping fluid within the working chamber of the damper as the damper is compressed extended, the damper is able to produce a damping force which counteracts suspension system vibration which wold otherwise be transmitted from the suspension to the body. By further restricting the flow of damping fluid within the working chamber of a damper, greater damping forces are generated by the damper.

In determining the optimal amount of damping that a damper should provide, three vehicle performance characteristics are often considered: ride comfort, vehicle handling and road holding ability. Ride comfort is typically a function of the spring constant of the vehicle's main springs, as well as the spring constant of the occupant's seat, the vehicle's tires the suspension geometry, and the damper. Vehicle handling is related to changes in the vehicle's attitude (i.e., pitch, yaw, and roll). To achieve optimum vehicle handling, relatively large damping forces are required to avoid excessively rapid variation in the vehicle's attitude during acceleration, deceleration, and cornering. Road holding ability is generally dependent on the amount of contact between the vehicle tires and the ground. In order to optimize a vehicle's road holding ability, large damping forces are required as a vehicle passes over irregular surfaces in order to prevent loss of contact between the wheels and ground for an excessive period of time.

Because different driving characteristics require differing amounts of damping force from the damper in order to optimize its performance, it is often desirable to have a damper which can be adjusted to increase or decrease the requisite damping forces. One method for selectively changing a damper's damping characteristics is described in U.S. Pat. No. 4,890,858. This reference discloses a rotary valve for use in controlling a damper. The damper comprises a first valve member which is disposed within the pressure cylinder for establishing a plurality of flow passages. Furthermore, the damper comprises a second valve member also disposed within the pressure cylinder for establishing a second plurality of flow passages. In addition, the damper includes an actuator for providing an accelerating and decelerating force to the second valve member. Finally, control means for controlling displacement of the second valve member are also disclosed.

Because dampers which provide adjustable damping generally use a single valve to control the flow of damping fluid during both compression and rebound, a sensor is generally required to determine whether the damper is in compression or rebound. Not only does this provide a degree of difficultly in terms of sensor placement, there are also disadvantages with respect to the electronics which are required to generate an output indicative of whether the damper is in compression or rebound from the output of the sensor. Accordingly, these systems tend to be somewhat expensive.

SUMMARY OF THE INVENTION

The present invention relates to a damper which includes a pressure cylinder and a piston which is reciprocally mounted in the cylinder so as to define a compression chamber and rebound chamber. The compression and rebound chambers are operable to store damping fluid and the piston is movable for reciprocally varying the volumes of the compression and rebound chambers. The damper further includes a valve for controlling the flow of fluid between the compression and rebound chambers, as well as a reservoir for receiving damping fluid. A compression transfer tube is provided which allows fluid communication between the compression chamber and the reservoir. The damper further includes a compression valve in communication with the transfer tube as well as a base valve in the pressure cylinder in communication with the pressure chamber and the reservoir. Finally, the damper includes a reservoir fluid aperture in the reservoir for establishing fluid flow from the reservoir to the rebound chamber.

Accordingly, the primary object of the present invention is to provide a semiactive damper for use in an automatic damping system of a vehicle which can be controlled by individually dedicated or shared electronic control modules. In this regard, a related object of the present invention is to provide a simplified and lower cost semiactively adjustable damper in which adaptive external valves allow for independent adjustable setting of the damper damping in rebound and compression.

A further object of the present invention is to provide a semi-active damper in which a pair of separate dedicated valving systems are utilized to soften damper damping in rebound and compression, which simplifies the damper while still providing an automatic damper system in which the rate of damping fluid flow between upper and lower portions of a working chamber may be controlled with a relatively high degree of accuracy. A related object of the present invention is to provide a semi-active damping system in which detection of rebound-compression transitions for each damper are not required which eliminates the need for a position sensor to sense the transition, yet still allows for achievement of separately tailored compression and rebound characteristics.

Further objects, features and advantages of this invention are to provide a damper which can be easily and readily adjusted automatically and semi-actively to optimize damping characteristics, with separate discrete or continuously variable external valves achieving separate damping settings in rebound and compression, and which has a long service life and is rugged, durable, reliable, of simplified design and of relatively economical manufacture and assembly.

BRIEF DESCRIPTION OF THE DRAWINGS

Various advantages of the present invention will become apparent to those skilled in the art upon reading the following detailed description, appended claims, and accompanying drawings in which:

FIG. 3 is a center line sectional and side elevational view of the damper shown in FIG. 2, showing the compression and rebound valves in closed positions.

DETAILED DESCRIPTION OF THE PREFERRED EMBODIMENT

The following description of the preferred embodiment of the present invention is merely exemplary in nature and is in no way intended to limit the invention or its application or uses.

Figure 1:
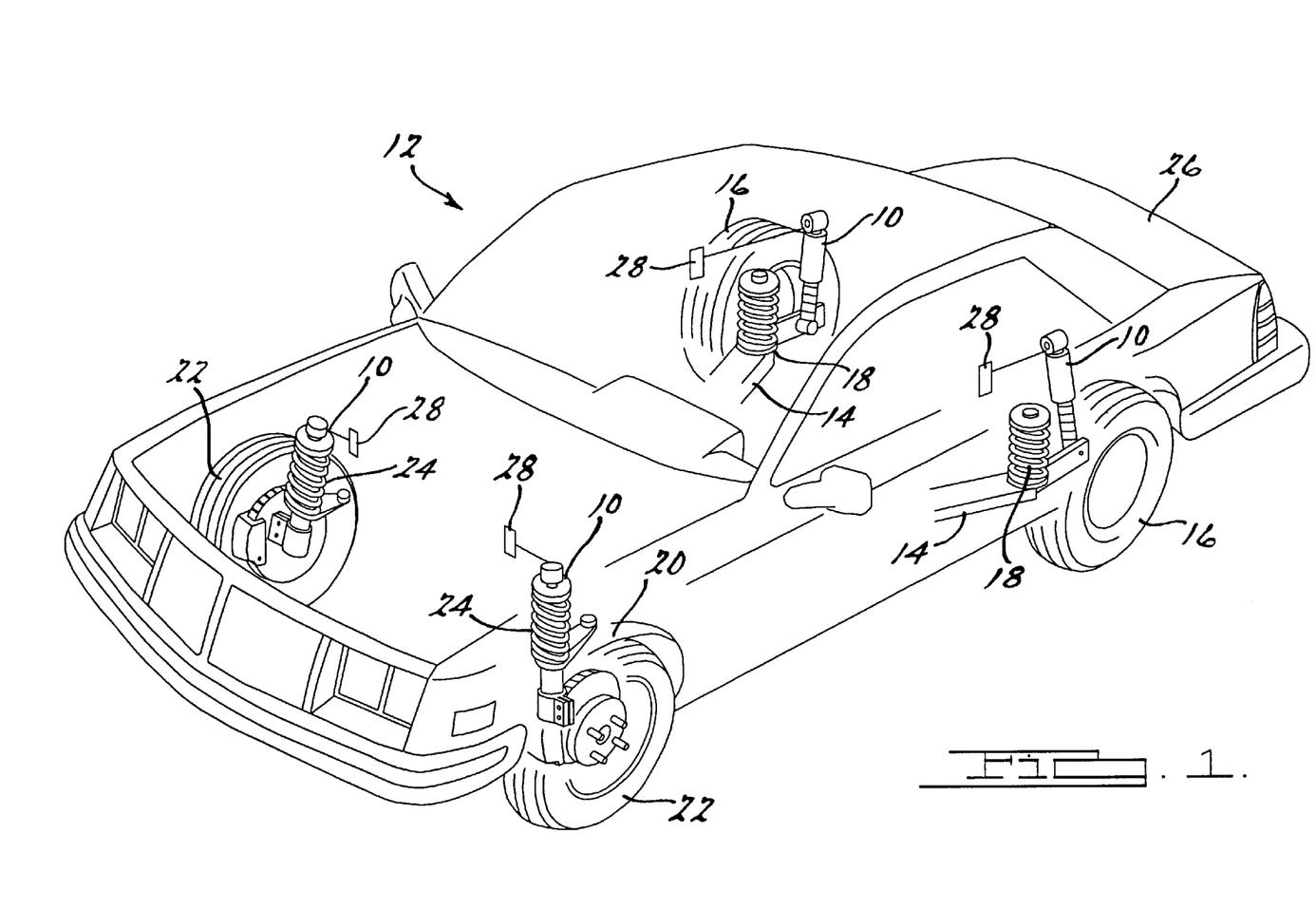
FIG. 1 is an illustration of an automobile using a plurality of semi-active fluid dampers according to the teachings of a preferred embodiment of the present invention.

Referring now to FIG. 1, a plurality of four dampers 10 according to the preferred embodiment of the present invention are shown. Each damper 10 is depicted in operative association with a diagrammatic representation of a conventional automobile 12. Automobile 12 provides a rear suspension system 14 having a transversely extending rear axle assembly (not shown) adapted to operatively support the vehicle's rear wheels 16. The rear axle assembly is operatively connected to the automobile 12 by means of a pair of dampers 10 as well as by helical coil springs 18. Similarly, automobile 12 has a front suspension system 20 including a transversely extending front axle assembly (not shown) which operatively supports the front wheels 22. The front axle assembly is operatively connected to the automobile 12 by means of a second pair of dampers 10 and by the helical coil springs 24. The dampers 10 serve to damp the relative movement of the unsprung portion (i.e., the front and rear suspension systems 20 and 14) and the sprung portion (i.e., the body 26) of the automobile 12. While the automobile 12 has been depicted as a passenger car, the damper 10 may be used with other types of automotive vehicles or in other types of vehicles or system applications. Furthermore the term "damper" as used herein will refer to dampers in general and will include shock absorbers and McPherson struts.

In order to automatically adjust the dampers 10 of this invention, an electronic control module 28 is electrically connected to the dampers. As depicted in FIG. 1, each damper 10 is provided with a dedicated electronic control module 28. Each control module 28 is used for controlling operation of each damper 10 in order to provide appropriate damping characteristics during compression and rebound resulting from movement of the body 26 of the automobile 12. While the present invention is being illustrated with dedicated control modules 28, it is within the scope of the present invention to utilize a single control module communicating with each damper 10. Various techniques are known in the art for implementing electronic control modules in conjunction with dampers in order to regulate damping characteristics of a damper through variation of fluid flow valves in the damper.

As a general rule, it is desirable to have soft damping when the frequency of movement of the body 26 of the automobile 12 in the vicinity of damper 10 is less than a first specified frequency as well as when it is above a specified frequency. It is also generally desirable to have firm damping only when the acceleration of body 26 of automobile 12 in the range of the damper 10 exceeds a preselected value even when the frequency of the acceleration is between the first and second specified frequencies. Furthermore, it is generally desirable to separately adjust between soft and firm damping for the rebound mode and for the compression mode, which means the transition between rebound and compression modes must be detected in order to selectively switch parameters in order to achieve the desired optimal rebound and compression performance stiffness parameters during each mode. By designing a damper which has separate valving for the rebound mode and the compression mode, the electronic control module 28 can be used to generate an electronic control signal for separately and concurrently setting desirable compression and rebound damping characteristic of the damper 10 to which it is connected.

Figure 2:
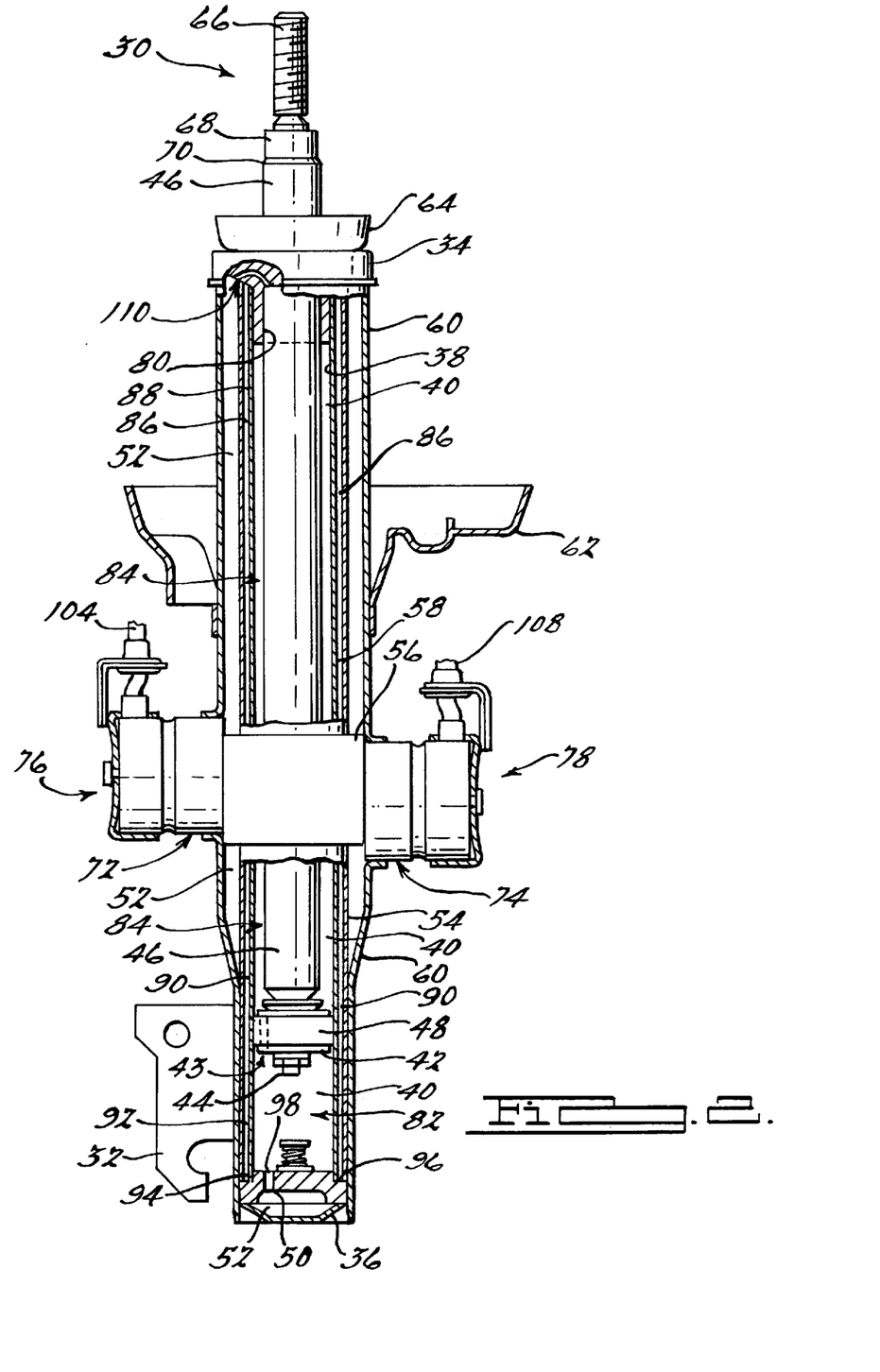
FIG. 2 is a schematic representation of the damper utilized in FIG. 1 using the automatic, or semi-active, damping system according to the teachings of the preferred embodiment of the present invention.

Referring to FIG. 2, to retain the damper 10 to an automotive vehicle 12, the damper 10 includes an upper end fitting 30 and a lower end fitting 32. The upper end fitting 30 extends through an upper cap portion 34 and is connected to a vehicle body structure, such as a shock tower (not shown). Similarly, the lower end fitting 32 is connected to the damper 10 adjacent a lower cap portion 36 so as to secure the damper 10 to one of the suspension systems 14 and 20. As will be appreciated by those skilled in the art, other suitable means may be used to secure the damper, or dampers, 10 to the automotive vehicle 12.

As shown in FIG. 2, the damper 10 of this invention comprises an elongated tubular pressure cylinder 38 defining a damping fluid-containing working chamber 40, and disposed within the chamber 40 is a reciprocal piston 42. The reciprocal piston 42 is secured to one end of an axially extending piston post 44 which is in turn secured to one end of an axially extending piston rod 46. Alternatively, the piston 42 can be secured directly to one end of piston rod 46. Preferably, the piston 42 carries an annular TEFLON™ sleeve 48 which is trapped on the outer circumference of the piston to permit movement of the piston with respect to the pressure cylinder 38 without generating undue frictional forces. Additionally, the piston 42 is further provided with a bi-directional flow valve 43 which allows regulated flow of damping fluid from one side of the piston to the other, or alternatively, is provided with at least a pair of uni-directional flow valves arranged on piston 42 for opposite-directional fluid flow therethrough. Further variations of piston valves are presently known in the art which include spring biased valves with valve seats which provide fluid flow in a regulated manner above a threshold pressure, or alternatively, metering pins and orifices which variably regulate fluid flow depending on exerted pressure therethrough. A further explanation of the construction and operation of pistons and piston valves is disclosed in U.S. Pat. No. 4,113,072, which is hereby incorporated by reference.

A base valve 50 is located within the lower end of the pressure cylinder 38 and is used to control the flow of damping fluid between the working chamber 40 and an annular fluid reservoir 52. The annular fluid reservoir 52 is defined as the space between the outer periphery of a compression transfer tube 54, a circumferential interface ring 56, and a rebound transfer tube 58 and the inner periphery of a reservoir tube 60 forming the exterior surface of the damper 10. Preferably, the operation of base valve 50 is similar to the operation of the base valve shown in U.S. Pat. No. 3,757,910, which is hereby incorporated by reference. However, other types of base valves may be used.

In addition to receiving the upper and lower cap portions 34 and 36, reservoir tube 60 of damper 10 may support a spring base flange 62 such that flange 62 is received circumferentially about tube 60 where it is welded.

Additionally, a support collar 64 is received circumferentially about the piston rod 46 where it exits through upper cap portion 34 such that the collar 64 is retained atop the upper cap portion 34. The spring base flange 62 receives a bottom end of a helical coil spring 18 (as depicted in FIG. 1) which is circumferentially carried about the top end of the damper 10. Likewise, a spring cap (not shown) is received on the top of spring 18 such that a hole in the cap mates with a collar 68 formed on piston rod 46 and abuts with a corresponding shoulder 70 onto which it is trapped by threading a nut (not shown) onto threaded end 66. The spring cap is first loaded onto the threaded end 66 before loading end 66 into a receiving hole formed in vehicle body shock tower (not shown), such that a nut is threaded onto end 66 which traps the shock tower and spring cap to the end of the piston rod 46. Vehicle loads produced between the vehicle shock tower on the piston rod 46 react against loads imparted by lower end fitting 32 which is affixed to a vehicle wheel such that compression therebetween counteracts forces produced by a coil spring 18. In its assembly configuration, the spring acts in a compressive mode to space apart base flange 62 from the spring cap on the end of the piston rod 46. Finally, the apertures 72 and 74 are provided through reservoir tube 60, on opposite sides, such that each receives a compression valve 76 and a rebound valve 78, respectively. The compression valve 76 and rebound valve 78 fluidly communicate with a circumferential interface ring 56 against which they are sealingly retained. Preferably, each aperture 72 and 74 is circumferentially welded to a valve housing of each valve 76 and 78.

Reciprocating motion of the piston 42 and the piston rod 46 within the pressure cylinder 38 is axially guided by sliding contact of annular TEFLON sleeve 48 within the pressure cylinder 28 at one end, and by sliding and sealing reciprocation of the piston rod 46 through a rod guide 80 which is supported by the upper cap portion 34 to seal the top end of the damper 10, and slidably seal the piston rod as it exits therethrough. Various configurations for rod guides which incorporate single and multiple circumferential seals are well known in the art for sealing and seating the ends of dampers.

Reciprocation of the piston 42 within the work chamber 40 formed inside pressure cylinder 38 partitions the work chamber to define a variable volume compression chamber 82 and a variable volume rebound chamber 84. Damping fluid is provided in both the compression chamber 82 and the rebound chamber 84.

A rebound transfer volume 86 is formed between the exterior surface of the pressure cylinder 38 and the interior surface of the rebound transfer tube 58, and is further defined at either end by the rod guide 80 and the circumferential interface ring 56, respectively, with which they seal. A rebound connection opening 88 is formed in the pressure cylinder 38 proximate the rod guide 80 which provides damping fluid flow between the rebound transfer volume 86 and the rebound chamber 84. If desired, opening 88 can be formed in rod guide 80. Additionally, the rebound transfer volume 86 communicates through rebound transfer tube 58 with rebound valve 78.

A compression transfer volume 90 is formed between the exterior surface of the pressure cylinder 38 and the interior surface of the compression transfer tube 54, and is further defined at either end by base valve 50 and circumferential inner face ring 56, respectively, with which they seal. A compression connection opening 92 is formed in the pressure cylinder 38 proximate the base valve 50 which provides damping fluid flow between the compression transfer volume 90 and the compression chamber 82. Additionally, the compression transfer volume 90 communicates through the compression transfer tube 54 with the compression valve 76.

The base valve 50 mates within the pressure cylinder 38 at one end as a decreased diameter shoulder 94 on the valve 50 is received within pressure cylinder 38 where it substantially circumferentially seals therebetween, and an annular face 96 on the valve 50 seats against both ends of pressure cylinder 38 and compression transfer tube 54 such that a seal is formed therebetween which cooperates in defining the compression transfer volume 90. Preferably, the base valve 50 is circumferentially welded to the end of the compression transfer tube 54. Preferably, the base valve 50 is provided with a fluid aperture 98 which controllably regulates a bidirectional fluid flow between the compression chamber 82 and the fluid reservoir 52. Various other forms of base valves are presently known in the art for providing bidirectional flow in the bottom of a damper.

As shown in FIG. 3, the compression valve 76 and rebound valve 78 sealingly fasten to the reservoir tube 60 such that they extend through apertures 72 and 74, respectively, and abut and seal in fluid communication with fluid ports provided in circumferential interface ring 56. The compression valve 76 has a solenoid 102 in electrical communication through a flex cable 104 with the accompanying electronic control module 28 which selectively electrically sends signals to engage and disengage the solenoid which opens and closes the compression valve 76. By electrically activating the solenoid 102, the compression valve 76 is opened which provides a flow of damping fluid from the compression transfer volume 90 into the annular fluid reservoir 52 in response to compressive motion of piston 42 toward the compression chamber 82. Likewise, the rebound valve 78 has a solenoid 106 in electrical communication through a flex cable 108 with the same electronic control module 28 which selectively electrically activates and deactivates the solenoid to close and open, respectively, the rebound valve 78. As a consequence, when rebound valve 78 is opened by activating solenoid 106, fluid flows from rebound transfer volume 86 into a compression transfer volume 90 in response to rebound motion of the piston 42 towards the rebound chamber 78.

It is to be understood that opening of the compression valve 76 and the rebound valve 78 through activation of the solenoid 102 and activation of the solenoid 106, respectively, produces supplemental fluid flow between the compression chamber 82 and the reservoir 52, and between the rebound chamber and the compression chamber. Primary fluid flow between the compression chamber 82 and the rebound chamber 84 is provided by damping fluid which flows through the piston aperture 43. By closing the compression valve 76, the stiffness of the damper 10 during compression is increased. Likewise, by closing the rebound valve 78, the rebound stiffness of the damper 10 is decreased. Through either discrete fluctuation of the valve 76 and 78, or continuously variable actuation of such valves, fluid flow between the compression chamber 82 and rebound chamber 84 can be tailored to provide adjustable stiffness of the damper 10 in an independent manner for both pressure cycles and rebound cycles.

In the case of fluid flow from the compression chamber 82 through the compression valve 76 and into the rebound chamber 84, it is to be understood that the damping fluid travels a circuitous path. Damping fluid compressed in the compression chamber 82 is passed through the base valve 50 which empties into the fluid reservoir 52. Concurrently, damping fluid in compression chamber 82 exits through the compression connection opening 92 into the compression transfer volume 90 where it passes through the compression valve 76, while in an open position, into the reservoir 52. Further transfer of fluid from the reservoir 52 is provided through a reservoir fluid aperture 110 (FIG. 1) which is formed in the rod guide 80 for transferring fluid from the reservoir 52 into the rebound chamber 84. Furthermore, the rebound chamber 84 communicates with the rebound transfer volume through the rebound connection opening 88 such that fluid compressed in the rebound chamber is transferred through rebound transfer volume 86 through the rebound valve 78, when in an open position, and into the annular fluid reservoir 52 which further transfers fluid through the compression connection opening 92 into the compression volume 82.

Figure 4:
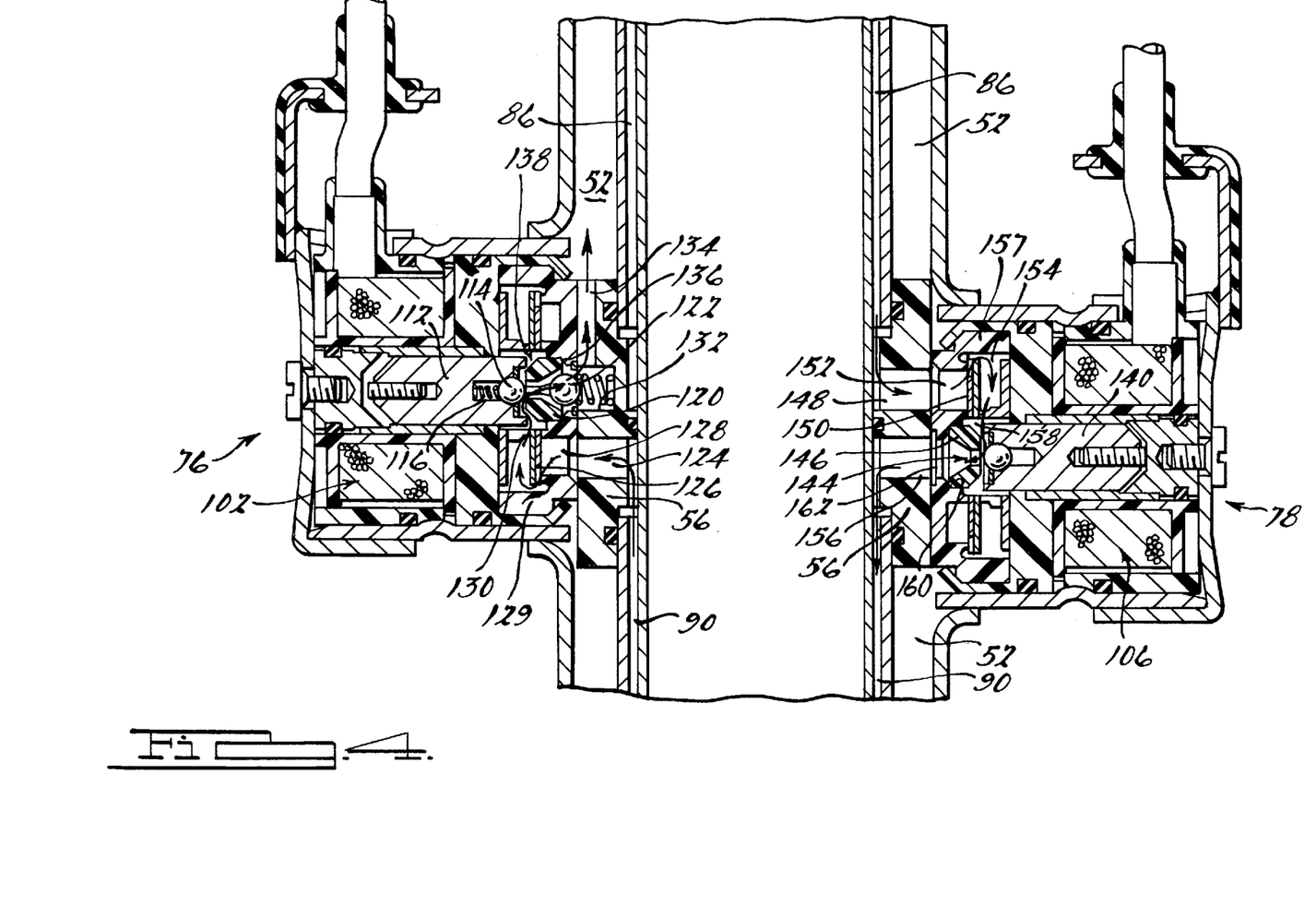
FIG. 4 is a view corresponding to that shown in FIG. 3 depicting the compression and rebound valves in open positions.

As shown in FIGS. 3 and 4, the solenoid 102 has an axially extendable and retractable core 112. The core 112 is formed from a ball 114 biased by a spring 116 and a sealing plate 118. When deactuated, the core 112 moves towards a seat 120 sealing off fluid flow through the center bore of seat 120 with the ball 114 in a first stage. Fluid flow continues through the seat 120 due to a plurality of bleed holes 121 circumferentially spaced around the central bore of the seat 120. In a second stage, the sealing plate 118 seals against the seat 120 to seal off the bleed holes 121 extending through the seat 120. The two stage sealing described above reduces the water-hammer effect of closing compression valve 76. A check valve 122 prevents back flow from reservoir 52 to compression transfer volume 90.

As shown in FIG. 4, compression valve 76 is depicted with reference arrows showing flow of damper fluid through the valve while it is in an open position. Fluid is delivered from the compression transfer volume 90 through the compression valve 76 and into the fluid reservoir 52 via flow ports in the circumferential interface ring 56 which is mated with a valve collar 129 to the assembly of solenoid 102 to form the compression valve 76. Fluid leaving the compression transfer volume 90 enters a radial port 124 which opens into a circumferential upstream well 128 in the collar 129 where damping fluid is passed through a bleed disc 126 into a circumferential downstream well 130 to transfer through the center bore of seat 120 while solenoid 102 is energized. The upstream well 128 and the downstream well 130 are integrally formed within the collar 129. Likewise, the bleed disc 126 is seated in the ring between the upstream and downstream wells. The seat 120 is carried in a receiving bore 136 interjacent the upstream well 128, and fluid flows through a central aperture 138 in the bleed disc 126 where it is delivered to the center bore of seat 120. Upon energizing the solenoid 102, fluid flows past check valve 122 into a spring port 132 which supports the check valve 122, where damping fluid is further delivered through an exit port 134 into the reservoir 52.

As further shown in FIGS. 3 and 4, the solenoid 106 is energized such that a core 140 having an end mounted plunger ball 142 is retracted from a flow orifice 144 and a plunger seat 146 through which flow is provided, thus opening the rebound valve 78. The rebound valve 78 is provided in sealing abutment against flow passages provided in the circumferential interface ring 56 by welding the solenoid 106 outer housing circumferentially to aperture 74. As a result, a flowpath is provided from the rebound transfer volume 86 through the interface ring 56, into and through the rebound valve 78, back through the interface ring 56, and out through the compression transfer volume 90. More particularly, damping fluid flows from rebound transfer volume 86 into a first radial port 148 formed in the interface ring 56 which empties into a circumferential upstream well 152, through a bleed disc 150 and into a circumferential downstream well 154 where it passes through a central aperture 158 in the bleed disc 150 for transfer through orifice 144. The circumferential upstream and downstream wells 152 and 154 are provided in a valve collar 157 carried in the rebound valve 78 which seats and abuts with the interface ring 56 on one side, and abuts with the solenoid 106 on the other side, and further provides a receiving bore 160 for carrying plunger seat 146 therein. Furthermore, a flow exit port 162 is provided downstream of the plunger seat 146 through which damping fluid exits from flow orifice 144 and enters a second radial port 156 provided in the interface ring 156 for exit to the compression transfer volume 90. As depicted in FIG. 4, the solenoid 106 is activated in a retracted position which provides fluid flow through the rebound valve 78. By de-energizing the solenoid 106, the rebound valve 78 is activated, axially extending core 140 and the plunger ball 142 to seal with the plunger seat 146 and stop flow through the orifice 144, thereby effectively shutting off the rebound valve 78.

In operation, the solenoid 102 can be energized to open the compression valve 76 in order to provide a bypass flow of damping fluid over flow provided through the base valve 50, as well as the flow apertures 98 provided in the piston 42. By energizing the solenoid 102 and opening the compression valve 76, the flow of damping fluid in the compression chamber 82 is provided into the reservoir 52, via the various flow paths described above. By providing by-passing fluid flow in addition to fluid flow of the piston 42 and the base valve 50, compressive damping of the damper 10 can be varied. In operation, the solenoid 106 is de-energized to close rebound valve 78, and is energized to open the rebound valve 78. When opened, a by-pass flow is created for damping fluid in addition to fluid valves, or ports, provided in the piston 42. This by-pass flow is regulated by the bleed disc 150, valving or slots formed in the disc. In operation, while the rebound valve 78 is open, hydraulic fluid volume passing through the rebound valve, at low pressure after leaving the rebound valve, will partly fill the compression chamber 82, via the compression transfer volume 90. The damping fluid flows through the compression connection chamber 82, via the compression transfer volume 90. The damping fluid flows through the compression connection opening 92 which further meters transfer of the fluid between the compression transfer volume 90 and the compression chamber 82. Each of the preceding occurs during the rebound phase of the piston 42 in the damper 10. Furthermore, the check valve 122 in the compression valve 76 prevents damping fluid flow from being sucked into the compression chamber 82 through the compression valve 76 while the piston 42 is in rebound. Furthermore, remaining damping fluid necessary for filling the compression chamber 82 is provided through the intake of the base valve 50 as the piston 42 is moved upward toward a rebound position.

While it is apparent that the preferred embodiment illustrated above is well-calculated to fulfill the objects stated, it will be appreciated that the present invention is capable of modification, variation and change without departing from the scope of the invention. For example, from the discussion above, application of discrete valve concepts have been incorporated in the compression valves 76 and rebound valve 78 of the preferred embodiment. However, modifications are generally known in the art for providing variable flow orifices, such as metering pins having varying diameters which axially cooperate with flow orifices to provide annular flow paths, such that tailored flow delivery can be produced through each vale provide a continuously variable valve for both the compression and rebound phases of a damper 10. Furthermore, construction of a rebound transfer tube 58 which is concentric over pressure cylinder 38 can be substituted with a transfer tube of various other design currently utilized with normal external valve damper systems currently available on the market. Likewise, the disc valving provided through bleed discs 126 and 150 can be replaced by spring valving systems which regulate fluid flow, by increased dimensions of the valve.

In addition, various methods may be used for sensing accelerations or velocities of a vehicle suspension which dictate settings for tailoring damping characteristic in compression and rebound. For example, accelerometers can be provided atop each damper 10 which monitor shock conditions resulting from pitch, yaw, and roll, as well as interaction with various bumps and obstacles, such sensed signal being further processed by the electronic control module 28 and compared to determine the desired compression and rebound damping characteristics for the damper 10. As a result, compression valve 76 and rebound valve 78 are actuated accordingly. In accordance, the scope of the invention is to be measured against the scope of the following claims.

What is claimed is:

1. A damper comprising:

a pressure cylinder;

a piston reciprocally mounted in said pressure cylinder to define a compression chamber and a rebound chamber, said compression and rebound chambers operable to store damping fluid, said piston movable for reciprocally varying the volumes of said compression and rebound chambers;

valve means provided on said piston for controlling flow of fluid between said compression and rebound chambers;

a reservoir tube surrounding said pressure cylinder to define a reservoir between said pressure cylinder and said reservoir tube;

a compression transfer tube disposed within said reservoir tube for providing fluid communication between said compression chamber and said reservoir;

a rebound transfer tube disposed within said reservoir tube for providing fluid communication between said rebound chamber and said compression chamber;

a compression valve in fluidic communication with said compression transfer tube and operable between open and closed positions to regulate fluid flow from said compression chamber into said reservoir in response to compressive motion of said piston toward said compression chamber, said compression valve further operable to prevent flow in response to rebound motion of said piston toward said rebound chamber;

a rebound valve in fluidic communication with said rebound transfer tube and operable between open and closed positions to regulate fluid flow from said rebound chamber into said compression chamber in response to rebound motion of said piston toward said rebound chamber, operation of said rebound valve being totally independent from operation of said compression valve;

a base valve carried in said cylinder in fluidic communication with said compression chamber and said reservoir, said base valve provided therebetween and spaced apart from said piston for controllably providing bi-directional fluid flow between said compression chamber and said reservoir; and a reservoir fluid aperture provided in said reservoir for establishing fluid flow from said reservoir into said rebound chamber in response to compressive motion of said piston toward said compression chamber.

2. The damper of claim 1, wherein said rebound valve is further operable between open and closed positions to regulate fluid flow from said compression chamber into said rebound chamber in response to compressive motion of said piston toward said compression chamber, said rebound valve providing a secondary fluid path which supplements a primary fluid path provided by said piston valve means.

3. The damper of claim 1 which also comprises a piston rod slidably and sealingly received in said cylinder, said rod having a proximal end carried by said piston and a distal end extending from said cylinder through a rod guide and seal provided at one end of said cylinder, said rod distal end movable between extended and retracted positions in cooperation with said piston.

4. The damper of claim 1, wherein said compression transfer tube is provided circumjacent said pressure cylinder generally coaxially about said compression chamber, said pressure cylinder having a compression connection opening which provides fluid communication between said compression chamber and said reservoir.

5. The damper of claim 1, wherein said rebound transfer tube is provided circumjacent said pressure cylinder coaxially about said rebound chamber, said pressure cylinder having a rebound connection opening which provides fluid communication between said rebound chamber and said compression chamber.

6. The damper of claim 1, wherein said reservoir is formed from a reservoir tube provided circumjacent said compression and rebound transfer tubes, and said compression and rebound transfer tubes are provided circumjacent said pressure cylinder, at opposite ends, respectively, whereby said reservoir is provided generally coaxially about said compression and rebound transfer tubes within said reservoir tube and said compression and rebound transfer tubes are provided generally coaxially about said pressure cylinder.

7. The damper of claim 1, wherein said piston valve means is a flow valve providing a flow-restricting orifice.

8. The damper of claim 1 which further comprises a variable flow regulating metering orifice provided in fluid cooperation with said compression valve for variably regulating fluid flow through said compression valve.

9. The damper of claim 8, wherein said metering orifice further comprises a metering pin having a pre-determined axially varying diameter which is axially movable between extended and retracted positions through a cylindrical flow orifice to provide a variable annular flow path for regulating fluid flow therethrough.

10. The damper of claim 1 which further comprises a variable flow regulating metering orifice provided in fluid cooperation with said rebound valve for variably regulating fluid flow through said rebound valve.

11. The damper of claim 10, wherein said metering orifice further comprises a metering pin having a pre-determined axially varying diameter which is axially movable between extended and retracted positions through a cylindrical flow orifice to provide a variable annular flow path for regulating fluid flow therethrough.

12. The damper of claim 1, wherein said rebound valve further comprises a solenoid having an axially movable core forming a plunger and a plunger seat providing a flow orifice, said core movable to an extended position which seats said plunger with said plunger seat and closes said rebound valve.

13. The damper of claim 1 which further comprises a circumferential interface ring sealingly and fittingly carried about said pressure cylinder circumjacent a medial portion, a first circumferential end fittingly and sealingly receiving a complementary end of said compression transfer tube and a second opposed end fittingly and sealingly receiving a corresponding complementary end of said rebound transfer tube, wherein said compression transfer tube, said ring, and said rebound transfer tube when assembled coaxially carry said pressure cylinder therein.

14. The damper of claim 13, wherein said compression valve and said rebound valve are carried radially outwardly of said ring, said ring providing fluid communication ports with said compression valve which communicate, respectively, with said compression transfer tube and said reservoir, and communication ports with said rebound valve which communicate, respectively, with said rebound transfer tube and said compression chamber.

15. The damper of claim 14, wherein said reservoir is formed from a first cylindrical tube circumjacent said compression transfer tube which is sealingly fastened to said compression transfer tube at a distal end and a first side of said ring at a proximal end, and a second cylindrical tube circumjacent said rebound transfer tube which is sealingly fastened to said rebound transfer tube at a distal end and a second side of said ring at a proximal end.

16. The damper of claim 14, wherein said reservoir is formed from a cylindrical tube provided circumjacent said compression transfer tube, said ring, and said rebound transfer tube, said reservoir having a pair of apertures through which said compression valve and rebound valve sealingly extend.

17. A fluid damper comprising:
a pressure cylinder;
a piston reciprocally mounted in said cylinder to define a compression chamber and a rebound chamber, said compression chamber and said rebound chamber operable to store damping fluid, and said piston movable for reciprocally varying the volumes of said compression chamber and said rebound chamber;
a reservoir tube surrounding said pressure cylinder to define a fluid reservoir between said pressure cylinder and said reservoir tube;
first external valve means disposed in fluid communication between said compression chamber and said fluid reservoir, said first external valve means operable for controllably regulating damping fluid flow therebetween to provide a desired compressive damping of the fluid damper; and
second external valve means disposed in fluid communication between said rebound chamber and said compression chamber, said second external valve means operable for controllably regulating damping fluid flow therebetween to provide a desired rebound damping of the fluid damper, operation of said second external valve means being totally independent from operation of said first external valve mans.

18. A method for regulating damping of a fluid damper having a damper fluid filled pressure cylinder, a reservoir tube surrounding said pressure tube to define a fluid reservoir, a piston reciprocally mounted in the cylinder to define a compression chamber and a rebound chamber, the compression chamber and the rebound chamber operable to store the damping fluid as the piston is movable therein for reciprocally varying the volumes of the compression chamber and the rebound chamber comprising the steps of:
providing a first external valve means disposed in fluid communication between the compression chamber and the reservoir;
providing a second external valve means disposed in fluid communication between the rebound chamber and the compression chamber;
controllably regulating said first external valve means to provide a desired damping fluid flow from the compression chamber to the fluid reservoir to provide a desired compressive damping of the fluid damper; and
controllably regulating said second external valve means independently from said first external valve means to provide a desired damping fluid flow from the rebound chamber to the compression chamber to provide a desired rebound damping of the fluid damper.

* * * * *